United States Patent
Koval et al.

[15] 3,646,427

[45] Feb. 29, 1972

[54] HIGH-VOLTAGE LIGHT-CONTROLLED SEMICONDUCTOR CONVERTER

[72] Inventors: Alexandr Deomidovich Koval, Belyaevo-Bogorodskoe, kvartal 48, korpus 17, kv. 41; Viktor Iosifovich Eremin, Gospitainy val, 3, kv. 86, both of Moscow, U.S.S.R.

[22] Filed: June 2, 1970

[21] Appl. No.: 42,707

[30] Foreign Application Priority Data

June 6, 1969 U.S.S.R. ....................1335560
Mar. 18, 1970 U.S.S.R. ....................1407851

[52] U.S. Cl. ....................323/21, 250/239, 321/8
[51] Int. Cl. ....................H02m 1/08
[58] Field of Search ....................323/21; 322/DIG. 4, 26; 250/89, 200, 227, 238, 239; 321/8

[56] References Cited

UNITED STATES PATENTS

| | | | |
|---|---|---|---|
| 3,508,137 | 4/1970 | Hill | 322/26 X |
| 3,157,843 | 11/1964 | Koncen | 250/214 X |
| 2,939,963 | 6/1960 | Rideout | 250/219 DF |

*Primary Examiner*—Gerald Goldberg
*Attorney*—Holman, Glascock, Downing & Seebold

[57] ABSTRACT

A high-voltage light-controlled semiconductor converter comprising semiconductor rectifying elements with light pickups, arranged all the way around a sphere, and a light-distributing system placed inside said sphere, for the best utilization of its luminous flux.

The converter is mainly intended for use on power transmission lines.

4 Claims, 3 Drawing Figures

HIGH-VOLTAGE LIGHT-CONTROLLED SEMICONDUCTOR CONVERTER

The present invention relates to high-voltage, hereinafter referred to as H.V., semiconductor converters and, more specifically, to H.V. light-controlled semiconductor converters.

Such converters may widely be used on power transmission lines.

There exist H.V. light-controlled semiconductor converters comprising semiconductor rectifying elements complete with light pickups and a light-distributing system acting upon them (see, for example, Swiss Pat. No. 462948, Nov. 15, 1968, "-Circuit with Power Thyristors Controlled by means of Photosensitive Elements").

In the development of H.V. light-controlled semiconductor converters much difficulty has been encountered in enabling light from a light source to reach light pickups with a maximum utilization of the luminant flux and in making the converter sufficiently compact. Existing types of H.V. semiconductor converters comprise, as a rule, a stack of semiconductor rectifying elements or a tube on which rectifying elements are arranged in a helix.

However, such semiconductor converters are unsuitable for use in a simple and compact H.V. light-controlled converter unit, because the rectifying elements are under differing conditions and a complicated light-distributing system has to be provided.

The main object of the present invention is to provide an H.V. light-controlled semiconductor converter which is simple in design, compact in size, and capable of utilizing the luminous flux of the associated light source to the utmost.

The object is accomplished by the fact that in an H.V. semiconductor converter according to the invention the semiconductor rectifying elements and their light pickups are arranged on the outer surface of a sphere, while a light-distributing system is arranged inside the sphere, with the result that the luminous flux of the source is utilized as much as practicable.

The converter framework may be fabricated in the form of a ribbon-shaped spherical helix from an insulating material, with webs placed between the turns so that the helix is divided into isolated cells enclosing semiconductor rectifying elements and their light pickups.

It is also preferable to place the converter framework in an enclosure which envelopes the framework so that there is a duct formed between the surfaces of the helix turns and the inner surface of the enclosure for a cooling agent.

The light-distributing system may be made up of a light conduit placed inside the sphere and directly connected by means of light distributing ducts to the light pickups of the semiconductor rectifying elements, and a light source placed outside the converters at ground potential.

An H.V. semiconductor converter, embodied in accordance with the present invention, successfully achieves the goals sought, is relatively small in size and convenient to use, and can find many uses at the converter substations of power transmission lines.

The invention will be best understood from the following detailed description of a preferred embodiment, when read in connection with the accompanying drawings, wherein.

Figure 1:
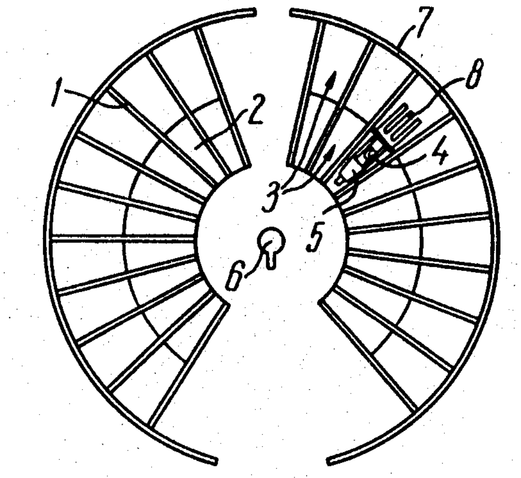
FIG. 1 is a cross-sectional view through the framework of a converter, according to the invention, with a semiconductor rectifying element installed in one of its cells, complete with a light pickup.
Figure 2:
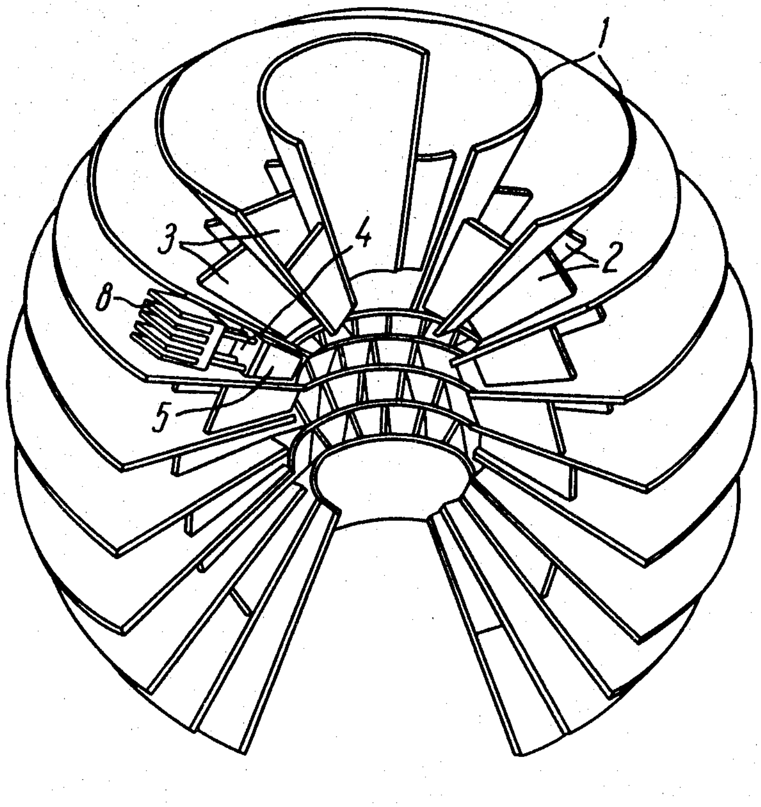
FIG. 2 is an axionometric view of the framework of FIG. 1.

As an example, consider an H.V. semiconductor converter whose components are arranged on a framework, as shown in FIGS. 1 and 2.

Referring to FIGS. 1 and 2, the framework is a constant-pitch spherical helix wound from an insulating ribbon 1, whose generatrix is directed along the radius of the sphere. The turns of the helix are linked by webs 2, also made from an insulating material, which divide the helix into isolated cells 3 distributed over the sphere. Each cell 3 encloses thyristors 4 serving as the rectifying elements of the converter, and their light pickups 5 (in FIGS. 1 and 2, only one cell is shown assembled).

Figure 3:
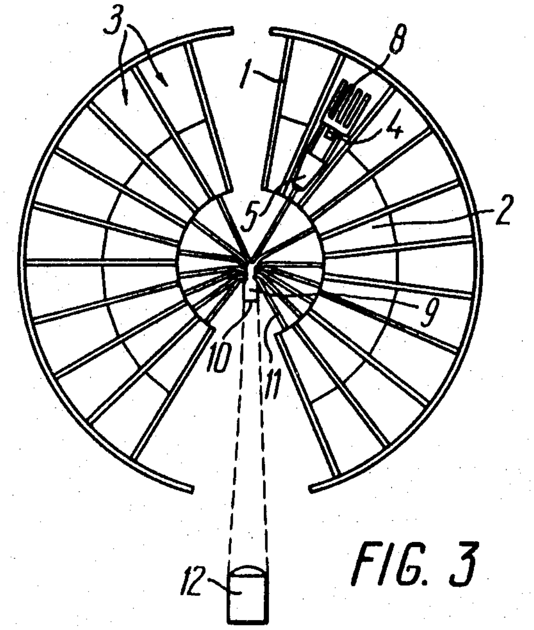
FIG. 3 shows the same converter framework with a light-distributing system consisting of a light conduit and a light source.

Located in the center of the framework is a light-distributing system which in the case on hand is an impulse xenon lamp 6. The converter uses air cooling which may be either natural or forced. In the latter case, the converter framework is built into an enclosure 7 fabricated from an insulating material. The space between the inside surface of the enclosure 7 and the outer surface of the turns of the helix forms a helical duct for cooling air forced in to cool the heat-sinks 8 of the thyristors 4. The thyristors 4 and the light pickups 5 are arranged in each cell 3 so that the light pickups 5 face the light-distributing system, while the heat-sinks 8 of the thyristors 4 are within the cooling duct on the perimeter of the framework. It should be noted that the converter may use any other form of cooling. The light-distributing system may consist either of only a light source, such as a xenon lamp placed in the center of the sphere as shown in FIG. 1, or a "spider-type" light conduit 9 (FIG. 3) with an entrance pupil 10 and radiating light ducts 11 directly connected to the light pickups 5 of the thyristors 4, and an impulse light source 12. With the light-distributing system arranged according to the second embodiment, the light conduit 9 is located, as in the first embodiment, in the center of the converter framework, and the impulse light source 12 is placed outside the converter at ground potential. The light conduit 9 is fabricated from optical fibers of equal length. At one end these fibers are compressed together, and the substantially unitary end thus formed is polished and forms the entrance pupil 10 of the light conduit 9, At the opposite ends, the fibers are grouped into bunches which form as many light ducts 11 as there are semiconductor rectifying elements. The ends of all the ducts 11 are likewise polished and each is attached to the respective light pickup 5. The light conduit 9 and the xenon lamp 6 may be placed inside the framework on a support set up outside the converter and passed inside the framework (not shown in FIGS. 1 and 3).

The light-distributing system according to the first embodiment should be preferably used in conjunction with a reliable impulse light source having a long service life and a spherical radiation front, while the second embodiment of the light-distributing system should be resorted to in cases where use is made of a light source with a short service life, so that it can be readily replaced.

The H.V. semiconductor converter disclosed herein operates as follows.

When the light-distributing system uses an impulse light source located directly inside the converter, the luminous flux emitted by the xenon lamp 6 is uniformly distributed among the light pickups 5 where the light signals are converted to electrical ones and are applied to the control electrodes of the thyristors 4. The lamp 6 can draw its power either from ground potential via an isolating transformer, or through a power takeoff circuit connected to a damping RC-network in the converter (not shown in the drawings). When the impulse light source is located outside the converter at ground potential, the luminous flux emitted by the light source 12 is incident upon the entrance pupil 10 of the light conduit 9 and is distributed by the light ducts 11 among the light pickups 5 where the light signals are likewise converted to electrical ones and are applied to the control electrodes of the thyristors 4.

The thyristors 4, which are the power elements of the converter, may be interconnected into any one of existing circuit configurations adapted for H.V. converters, while the power elements may alternately be photothyristors.

The converter unit may have no special framework. In such a case a rigid structure may be formed, for example, by the heat-sinks of thyristors, which are then made hollow for the purpose.

What is claimed is:

1. A high-voltage light-controlled semiconductor converter comprising semiconductor rectifying elements with light pickups and a light-distributing system acting upon said light pickups, characterized in that said semiconductor rectifying elements and their light pickups are arranged on a sphere and said light-distributing system is placed generally central of the sphere for the best utilization of its luminous flux.

2. A high-voltage semiconductor converter, as claimed in claim 1, in which the semiconductor rectifying elements and their light pickups are arranged on a framework fabricated in the form of a ribbon spherical helix from an insulating material, with webs placed between the turns so that the helix is divided into isolated cells enclosing said semiconductor rectifying elements and their light pickups.

3. A high-voltage semiconductor converter, as claimed in claim 2, in which said converter framework has an enclosure enveloping said framework so that there is a duct formed between the inner surface of said enclosure and the outer surfaces of the framework turns for a cooling agent.

4. A high-voltage semiconductor converter, as claimed in claim 1, in which said light-distributing system is made up of a light conduit placed inside the converter sphere and directly connected by means of light-distributing ducts to said light pickups of the semiconductor rectifying elements, and an impulse light source placed outside the converter at ground potential, whose luminous flux is directed upon said light conduit.

* * * * *